April 21, 1942.　　　　E. W. AUSTIN　　　　2,280,567
VEHICLE STORAGE DEVICE
Filed Feb. 6, 1939　　　　3 Sheets-Sheet 2
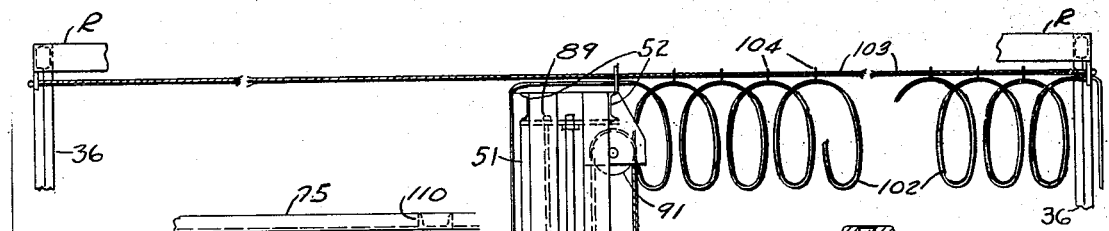
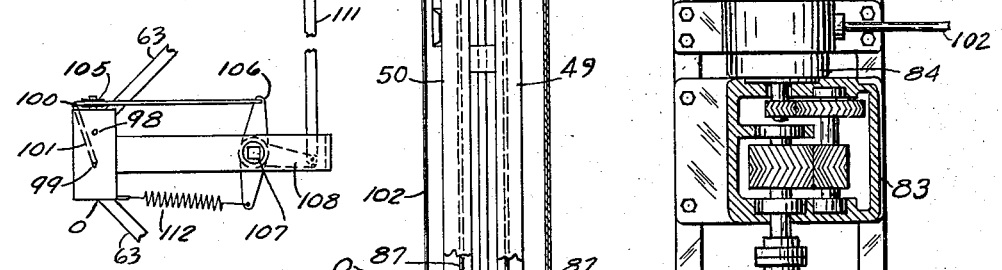
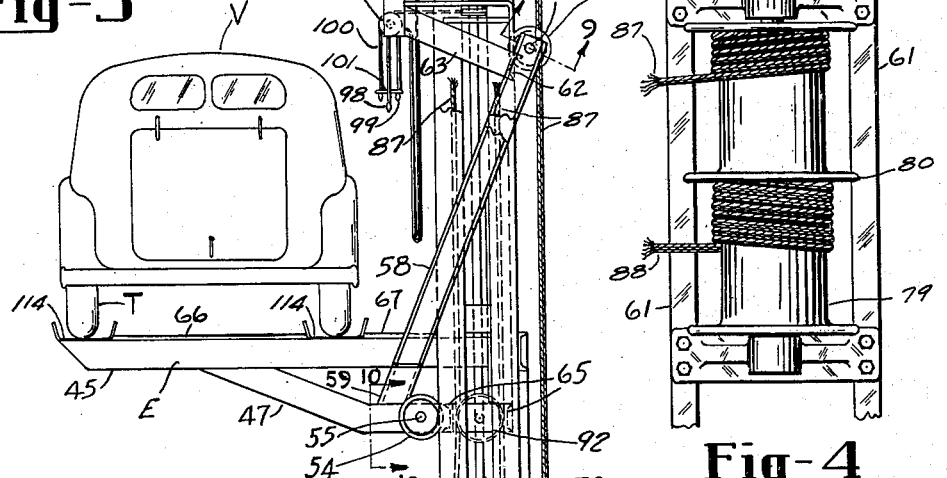
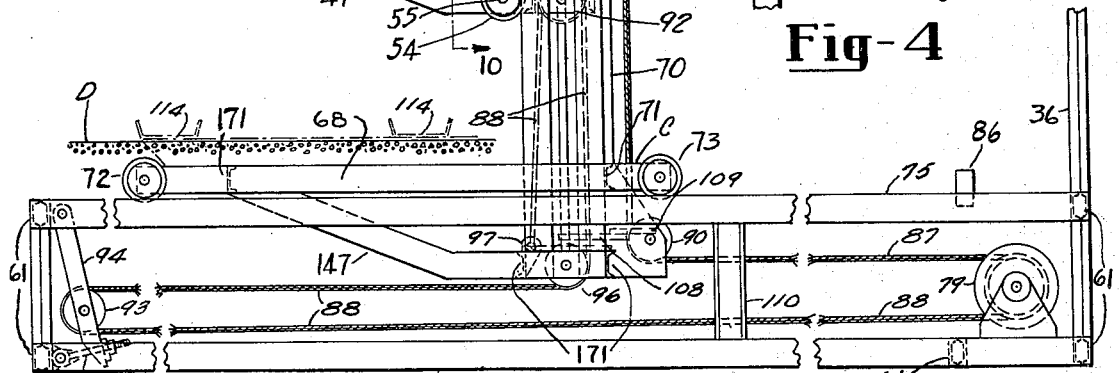
INVENTOR.
Ellsworth W. Austin

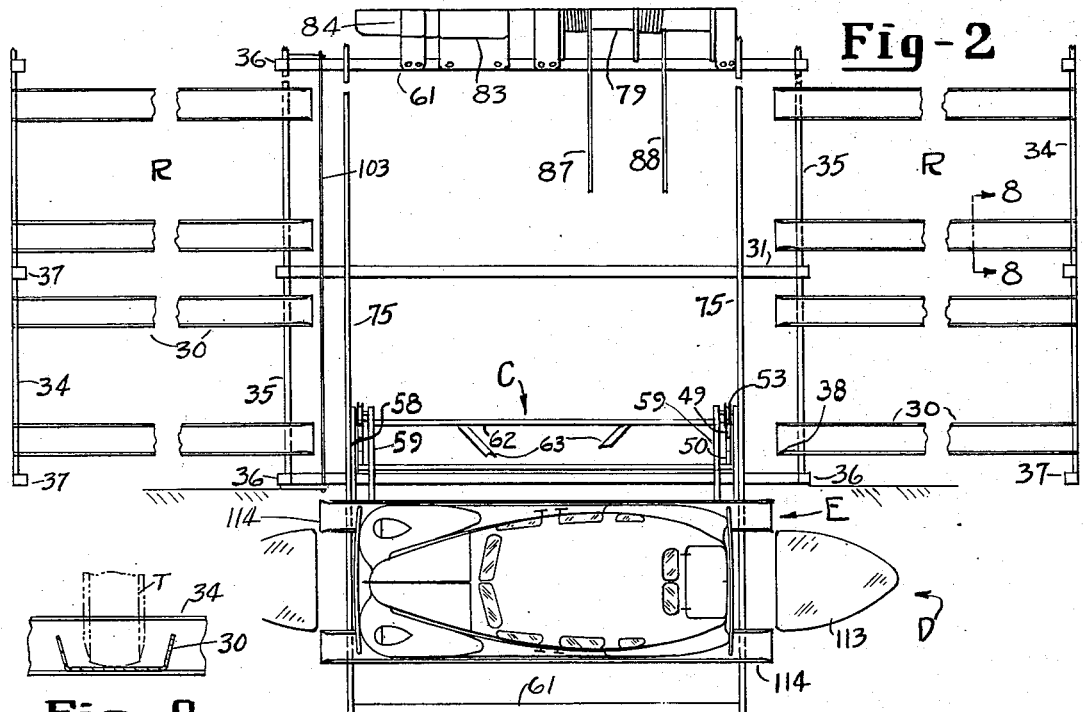
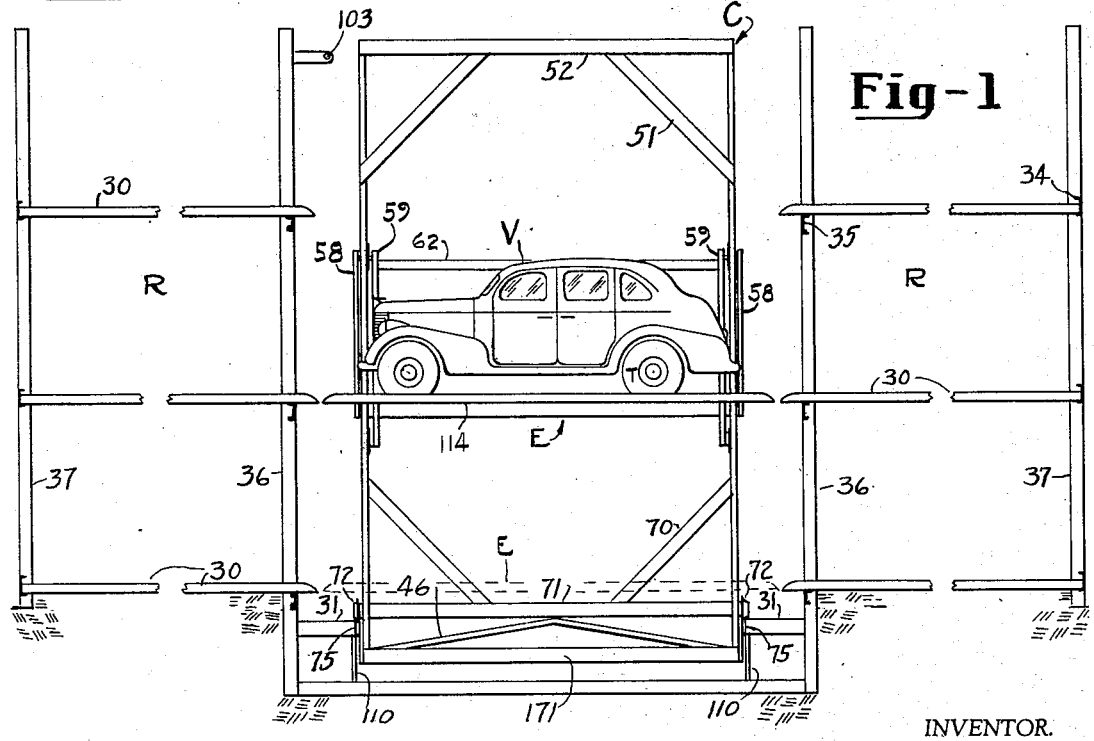

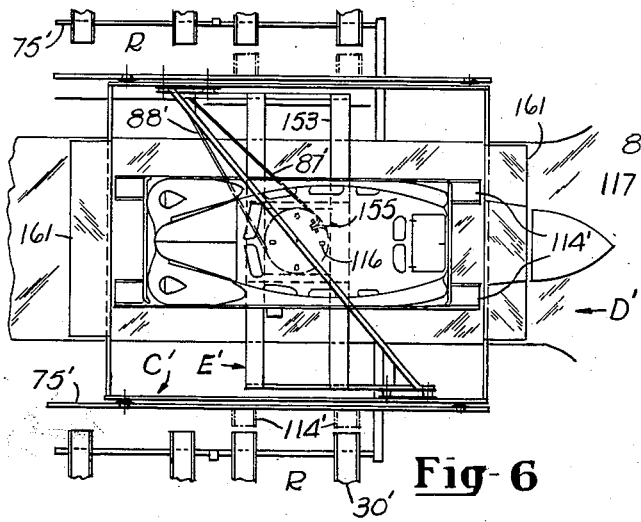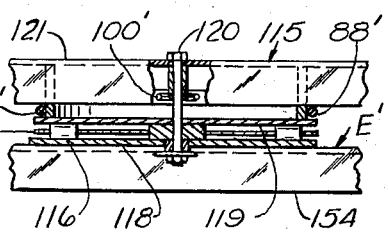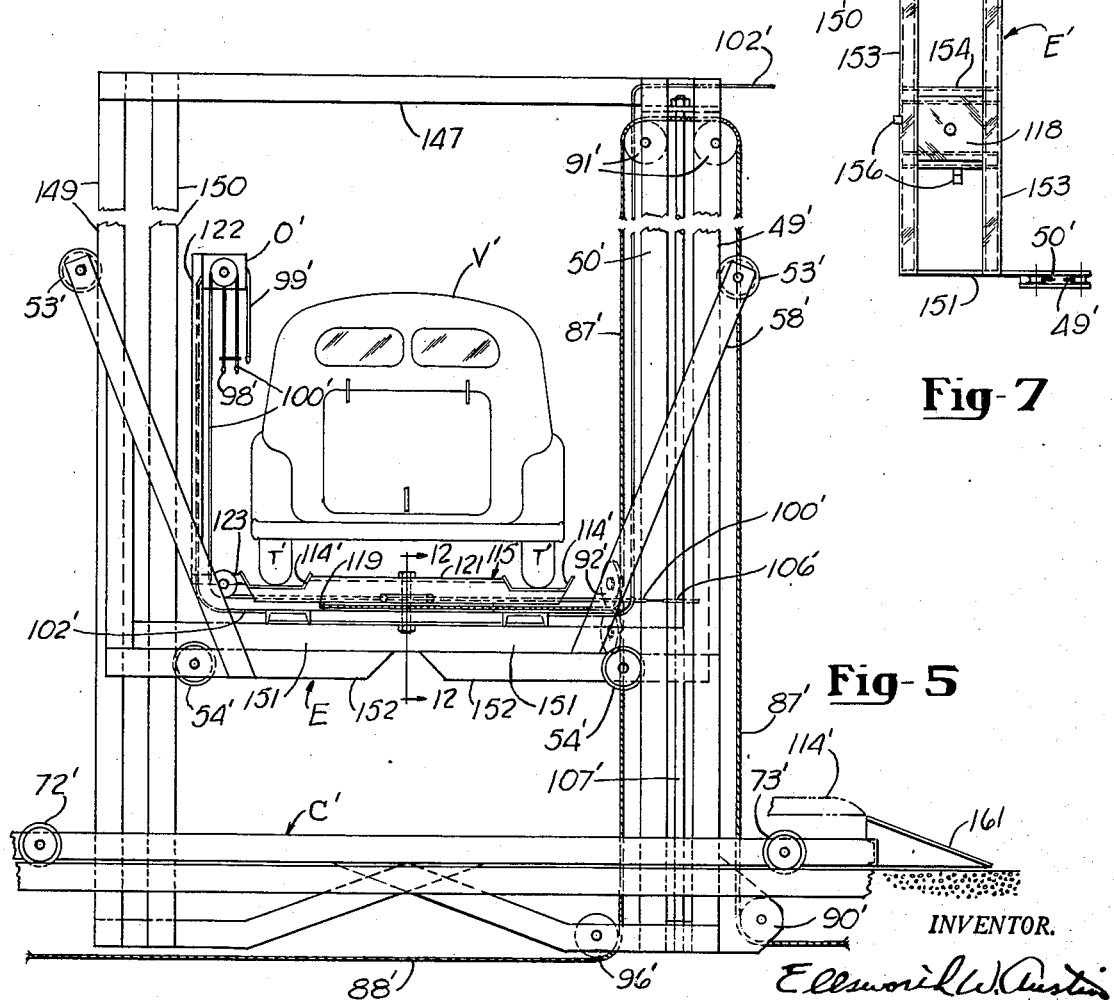

Patented Apr. 21, 1942

2,280,567

UNITED STATES PATENT OFFICE 2,280,567

VEHICLE STORAGE DEVICE

Ellsworth W. Austin, Cedar Rapids, Iowa

Application February 6, 1939, Serial No. 254,771

10 Claims. (Cl. 214—16.1)

An important object of the invention is to provide improved apparatus whereby a greater number of motor vehicles may be stored or parked in the space available in congested city districts.

Another important object of the invention is to provide a device capable of being operated by a single attendant who may remain seated in the vehicle while so operating.

Still another object is to provide a device including an elevator so constructed that a vehicle may be driven thereon, conveyed laterally to a desired storage position or elevated to a desired level or both conveyed laterally and elevated as selected by the attendant.

A further object is to include a common operating means for both conveying and elevating.

Yet another object is to provide a motor vehicle storage rack including runways for the vehicles being parked.

Another object being to provide a selector device by means of which a vehicle may be stored in any desired runway, as predetermined.

A still further object is to provide a turntable so arranged on an elevator that a vehicle may be driven thereon from the most convenient direction and then turned in a desired direction for storing.

An important object is to provide means for carrying out all the various movements required in storing motor vehicles, in a predetermined selected sequence and by a common operating device.

These, and further objects will be more fully evidenced from a study of the following description and accompanying drawings, wherein like characters represent like parts throughout the several views.

Fig. 1 is an end elevational view of a vehicle storage device with a motor vehicle in the process of being conveyed by the elevator to a suitable parking position, fragments of the device being broken away.

Fig. 2 is a plan view of the device showing a vehicle on the elevator which is in the receiving position a portion of a driveway being shown.

Fig. 3 is a side elevation of the carriage and elevator shown in Fig. 1, on a somewhat enlarged scale, in which the control system is introduced.

Fig. 4 is a detail plan view of the motor driven winch employed to operate the device.

Fig. 5 is a side elevation similar to Fig. 3, but showing a modification in which a turntable is employed on the elevator.

Fig. 6 is a plan view of the device, similar to Fig. 2, but to show how the turntable is employed.

Fig. 7 is a plan view of the elevator with the turntable removed.

Fig. 8 is an enlarged detail section of a runway, taken substantially on line 8—8 of Fig. 2, and looking in the direction of the arrows. The broken lines indicate a vehicle tire in place on the runway.

Fig. 9 is an enlarged detail section of an elevator member taken substantially on line 9—9 of Fig. 3.

Fig. 10 is likewise an enlarged detail section of the elevator taken on line 10—10 of Fig. 3.

Fig. 11 is a systematic plan view of the controller used.

Fig. 12 is a detail section taken on line 12—12 of Fig. 5.

Referring to the drawings which disclose the invention, I provide a vehicle storage rack generally referred to as R and having vehicle runways 30 etc. of channel section suitably arranged for receiving the tires T of vehicles V, preferably in double row formation and on a plurality of levels so that vehicles may be stored thereon as compactly as convenience will permit. The structure for supporting the runways 30 principally consists of longitudinal stringers 34 and 35 to which each of the runways are securely welded and which in turn are welded to spaced upright members 36 and 37. Again referring to the stringers which are of channel section, it will be noted that the outside stringers 34 are arranged at the ends of the runways in a manner to provide a safety stop for the engagement of tires on the stored vehicles.

Although the vehicle storage rack R is shown in the drawings to be arranged to receive vehicles on three levels, it will be readily understood that the device may be constructed with runways on several additional levels, uprights 36 and 37 to be proportionally lengthened.

Noting Fig. 2 particularly, rack R is disposed in a manner to provide an open center portion with vehicle storage portions extending longitudinally on either side. This arrangement is usually provided, however it may be assumed that a single storage portion may at times be used. With the preferred arrangement, vehicles may be brought into position by the elevator E, hereinafter described in detail, and when viewing Figure 1, may be stored either to the right or to the left and on any of the several levels. The runways 30 of rack R and runways 114 of the elevator E are suitably constructed to receive the tires T of a vehicle V. Fig. 8 clearly shows this feature and in Figure 2, it will be noted that the receiving ends of each runway are smoothly beveled at 38 to facilitate the passage of the tires T to and from the rack positions.

Viewing the elevator shown in Fig. 3, it will be seen that the runways 114 are welded to cantilever beams 45 which are rigidly braced by members 47. That the elevator may freely operate on the vertically spaced guide members 49 and 50, I provide ball bearing flanged rollers 53, best shown in Figure 9, mounted on the elevator structure to freely turn on journal pins 56 mounted in the upper portion of members 58 and 59. Figure 10 shows the mounting for the lower rollers 54, studs 55 being held solidly in the members 47 and providing alignment of the lower rollers 54 with the upper rollers 53, for it will be seen that the guide members 49 and 50 require such.

The various members such as 45, 47 and 58 are securely welded together at their contacting surfaces in a manner usually employed for building up electrically welded structures.

A connecting channel member 62 is stretched horizontally between the inner upstanding members 59, and projecting channel members 63 are welded midway on member 62, to afford a mounting for the operator's controller O. It will be observed that lower horizontal channel members 65 are employed to connect members 47 and also that a light gauge floor plate 66 is used to neatly fill in between the runways 114 and also a strip of the same material 67 is shown arranged for a similar purpose. Thus an operator when entering or leaving the vehicle, during elevator operations, may have a convenient standing space.

With a motor vehicle on the elevator there is a considerable load on the rollers 53 and 54 due to the over-hung or off-set construction, however this is found to work well in practice since a positive guidance is had with the flanged roller arrangement, also it is evident that no difficulty is encountered in keeping the rollers seated against their respective guides 49 and 50.

I will now describe the conveyor carriage C to which guides 49 and 50, previously mentioned, are solidly welded.

Lower brace members 70 which add to the solidness of construction, terminate in one of a pair of cross members 71, which tie girders 68 in parallel spaced relationship. Likewise members 171 are provided at the base of the guides 49 and 50 for the same purpose. Rollers 72 and 73 are constructed similarly to those employed for the elevator E, as shown in Fig. 10 and are arranged respectively at the ends of girders 68, while 147 represents a pair of reinforcing braces at the base of the carriage.

That the carriage may be well braced laterally, members 51 are employed at the top to assist overhead stringer members 52, which are employed to connect the guides 49 and 50 for proper cross spacing. Also for further lateral bracing, the members 46 are placed across corners of the carriage lower frame work.

The carriage C with elevator E arranged on it, is mounted on the spaced track members 75 which extend the entire length of the storage rack R, one on either side of the central open section and terminate appreciably in front of rack R. End members 61 are provided to receive both tracks 75 and base members 48 and also corresponding members are placed at the rear of rack R. Bracket members 31 are arranged intermediately along rack R for the support of the tracks 75. Struts 110 being further arranged to carry the load imposed on the tracks.

Although there may be various methods and arrangements for operating my vehicle storage device, I prefer the relatively simple cable operating arrangement illustrated in the drawings, and referring to Figure 4, a winch drum 79 is arranged with a dividing plate 80 to receive cables 87 and 88. A gear reduction unit 83 of the usual type is employed to be driven by a reversible motor 84 having an electric brake 85 also of usual type, for holding the motor against the load exerted by the pull of the cables. The operating units are mounted on the two rear cross members 61 as shown in Figure 4.

In tracing out the novel cable system, two flexible steel cables are used; cable 87 being the hoist cable and 88 being the return cable. The hoist cable 87 is wound over the winch drum 79 with sufficient turns that it may not become completely unwound at any time of the hoisting or lowering operations and is then passed through a grooved sheave 90 on the carriage C, then over a second grooved sheave 91 at the top of the carriage, thence downward to sheave 92 on the elevator E, thence upward again and securely fastened at deadend 89 at the top of the carriage. Cable 88 is also wound on the winch drum 79, but in the opposite direction to that of 87. Cable 88 first passes to an adjustable grooved sheave 93 at the front end of the device. Swinging support arm 94 being provided, with tension screw 95 arranged to take up the slack in the cable. Cable 88 next passes around sheave 96 on the carriage C, thence upward to a companion of sheave 92 on the elevator and again downward to be fastened at deadend 97 which is an eye welded to the carriage.

With the motor operating in a direction to wind the cable 87 on the drum 79, it will be seen that the elevator may be raised and that cable 88 will be unwound from drum 79. Also it will be seen that by reversing the motor the elevator may be lowered in a similar manner.

This process is operative only when the carriage C remains stationary on the track 75, but it is evident that this can not usually be the case since the weight of the elevator is appreciable and is considerably increased when a motor vehicle is driven thereon, and therefore will offer sufficient resistance to the cable 87 that the carriage will be drawn toward the winch until it is arrested at the end of its travel. Stop members 86 are thus provided. The elevator will then raise as a result of continued reeling action of the winch. Reversing the process, the elevator will first be lowered to its ground level position as indicated in dotted line, Figure 1, then the carriage will start to move along the track 75 until it reaches the end of its travel, and of course an ordinary limit switch may be employed for then throwing off the motor current to stop the device, which will be understood by those familiar with the art.

It will be assumed that the device must be controllable to stop for unloading or loading a vehicle at any desired position on any one of the various levels of the storage rack R, and to this end I provide the controller O, conveniently located for the operator, with ropes 98 and 99 hung in a position at one side or the other of the vehicle V for the convenience of the operator that he may reach out through the side window of the vehicle and operate the controller, without leaving his seat. The controller O is of the type often used for operating electric industrial hoists and the like and comprises a reversing switch for the motor; so that by pulling one rope as 98, the motor will run to lower the elevator and by pulling the other rope as 99, the elevator may be raised. When neither rope is pulled the device remains stationary as the electric brake 85 is then engaged to hold the load. The electric brake 85 is released however when the controller operates the motor 84 in either direction. Electric circuit cables 102 are shown arranged to pass upward from controller 0, thence overhead to the rear, downward and eventually to the motor 84 and electric brake 85. A steel cable 103 is provided to be tightly stretched from end to end of the rack R and rings 104 are placed at intervals to support the electric cable 102, that it may arrange itself in neat coils to suit the required length for any location of the carriage.

Again referring to the controller 0, it will be noted that a third rope 100 is provided and a small wooden bar 101 is also provided to connect the ends of ropes 99 and 100 together, thus to distinguish these two from rope 98 without visual selection on the part of the operator. Rope 100 is passed upward over a small sheave 105 mounted on the side of controller 0 and thence to a lever 106, shown in Figure 11. The spring 112 is also connected to the lever 106 at its opposite end to resist the pull on rope 105 and to return the lever after it has been moved by the operator. Thus through the medium of the square shaft 107 on the carriage and which extends vertically for most of the carriage height and through a second lever 108 at the lower end of the shaft, which connects through link 111 to latch 109, also mounted on the carriage, the operator may cause engagement of the latch 109 with struts 110, one of which is shown in Fig. 11 to arrest the travel of the carriage at predetermined positions. The struts 110 being located to suit.

The operation of the vehicle storage device, as shown in the preferred form already described, is as follows: By means of the electric remote controller 0 the reversible motor is operated to bring the carriage into position to receive a vehicle as shown in Fig. 2. The driveway D leading from the right having the usual slightly raised tire guide 113 projecting from the otherwise smooth concrete surface, so that no difficulty may be had in driving the motor vehicle onto the elevator runways 114 which, at the time, lay flat on the driveway surface as shown in the dotted lines 114 of Fig. 3. Likewise the vehicle may be driven off of the runways 114 onto the driveway at the left, as will be readily understood. Now assuming that it is desired to store the vehicle in any arbitrarily selected rack position, in the rack R, the operator remains in his driver's seat in the vehicle that is now driven onto the elevator and by reaching through the window of the vehicle, pulls the rope 99 whereupon the motor 84 causes the winch drum 79 to wind cable 87 and unwind cable 88. This will start the carriage C traveling along the rails 75. As the carriage approaches the desired location for storage, the operator moves his hand along the wooden bar 101 thus to pull both ropes 99 and 100 and as the latch 109 engages the stop 110, further carriage motion is arrested but a continuance of the pull on cable 87 starts the elevator E to raise and thus to be brought into position for driving the vehicle off of the elevator. A release of rope 99 causes a break in the electrical circuit in the usual manner and hence the elevator may be brought to rest at any desired level.

For ground level parking the elevator is not allowed to start upward at all, a release of rope 99 when the carriage reaches the desired position in its travel, accomplishes this.

In a similar manner to that described for parking a vehicle, a delivery of the vehicle may be accomplished. Assuming that a vehicle is parked on the storage rack R, it is only necessary to run the empty elevator into position, the operating ropes being easily reached by one standing on the elevator, whereupon the operator may drive the vehicle onto the elevator and without leaving the driver's seat, may cause the descent of the elevator by pulling the rope 98. In this case the reversible motor 84 will cause the winch drum 79 to rotate in a direction to unwind the cable 87 and to wind the cable 88. After the elevator has reached ground level a continuance of winding on cable 88, of course, returns the carriage C with the vehicle to the driving off position as shown in Fig. 2.

Referring to the embodiment of my invention shown in Figures 5, 6 and 7, it will be seen that elevator E is arranged with turntable 115 supported on the rollers 116 which are secured by a retaining plate 117. Roller races 118 and 119 are provided for the elevator E and turntable 115 respectively. A pivot bolt 120 is provided for securing the turntable in place and yet allowing free turning thereof, that a vehicle may be driven on and off as desired without upsetting the turntable. It should be noted that bolt 120 pierces the plate 117 and thereby provides a pivot for the entire roller assembly.

Further referring to turntable 115, runways 114' are provided for tires T' in the same manner as for elevator E which has been previously described. The inserted channel members 121 tie the runways together in spaced relationship.

A controller 0' having control members arranged in the same manner as controller 0, is mounted on a pedestal 122 which is welded at its base to a bracket 123 extending from one of the runways 114'. Thus it will be seen that the operator may reach out from his seated position in the vehicle V' and conveniently control the operation of the device.

With further reference to elevator E and its special construction and adaptability for receiving the turntable, it should be noted that guide members 49' and 50' are arranged on the right side toward the back of the carriage to which they are mounted similarly to members 49 and 50 as in the preferred form of my invention, and members 149 and 150 are arranged on the left side toward the front of the carriage in a similar manner. Cantilever members 151 are arranged to be welded to members 58 and these are reinforced with channels 152, the arrangement being the same for the right side and for the left side, but having the cantilever construction on the right side extending toward the front of the device and the cantilever construction on the left side extending toward the rear. Stringers 153 are welded at their extremities to the cantilever members 151 and have intermediate cross members 154 for the support of the previously mentioned roller race 118. Figure 7 especially shows this construction. Flanged rollers 53' and 54' are arranged similarly to rollers 53 and 54 described in connection with the preferred form already described in detail.

The carriage C' is practically identical to carriage C except that guides 149 and 150 for the left hand side are arranged as mentioned toward the front of the carriage, and reinforcing braces 147 are provided in accordance with this arrangement. Front and rear ramps 161 are optionally provided.

The operating cables for the device just described are arranged to be wound on the winch drum 79 as previously described in connection with my preferred form, and cable 87' passes around sheave 90' on the carriage thence upward and over sheaves 91', thence downward passing around the sheave 92', thence passing to the periphery of the roller race 119 to which it is securely fastened at deadend 155 indicated in Figure 6. Likewise cable 88' passes from the winch drum 79 to the adjustable sheave at the front of the device similar to 93 previously described, thence back to sheave 96' on the carriage, thence upward to sheave 192, thence to the periphery of the roller race and deadend 155.

Electric circuit cables 102' are provided for the arrangement just described in a manner similar to that described for the device not employing a turntable, except that an extension of the cable 102' passes under the elevator, thence to the pedestal 122 of the turntable and to the controller 0'. Likewise the stop latch control system is arranged to pass downward under the elevator thence to the lever 106' mounted on shaft 107' to function as previously mentioned.

In practice an operator or attendant drives onto the device from the driveway D' when the elevator is lowered and the carriage driven to the extreme front, however, at this time the turntable is in a position to receive a vehicle coming directly toward the device from the front, rather than from a driveway alongside as in the case previously described.

The operation is as follows: After the vehicle has been driven on to the turntable, the operator reaches out of the vehicle window and pulls rope 99' of the controller 0' and thus causes the motor 84 to start winding cable 87' and, of course, to unwind cable 88'. This operation causes first, turntable 115 to rotate as required, secondly, the carriage C' to travel as far as required, this being determined by the stop device similarly arranged to the one already described, then thirdly the elevator to rise to a selected storage position. Discontinuance of operation of the device being had upon release of the control rope. Likewise a vehicle may be driven from the rack onto the elevator properly positioned for its reception, then lowered and by further reeling or winding of the cable 88' on the winch drum similar to the one described as 79, the carriage will be returned to the first ground level position and the turntable rotated to the receiving position. Stops at 156 are provided for the turntable to limit its rotation as required.

Although in practice, many parts are assembled together to form one of my vehicle storage devices, it will be recognized that a large portion of the parts are duplicated, in some instances many times. Hence the cost of producing the present device is materially lessened and the rate of manufacture increased. Thought has been given to the design that such assemblies as the elevator, carriage, power unit, etc., may be factory built while the rack and similar sections are designed to be erected on the site, thus to facilitate the handling of materials and hasten the completion of a working device.

It has been found that in many instances in large cities the available space for erecting a device of this class is extremely limited in dimensions, especially in width, and thus the form described which employs a turntable is greatly preferred under such circumstances. A single narrow driveway leading from the street to the storage device, only need be had, and with this arrangement vehicles may be lowered from the rack to ground level and driven off at the rear through the open section of the rack, this space being cleared of obstructions such as the power unit, by placing them below ground level.

Certain specific embodiments of my invention have been described in detail yet it is to be understood that the particular structures shown are merely for the purpose of disclosing the development in the art and variations of the device may be resorted to within the scope of the invention and members shown may be omitted or others added yet holding the spirit of the description and claims.

I claim:

1. In a vehicle storage device, a storage rack arranged to receive motor vehicles, a carriage mounted to travel longitudinally of the rack, an elevator mounted on the carriage to raise and lower, said elevator being adapted for conveying a vehicle for storing on said rack, pulleys carried by said carriage, an operating device comprising a cable, means for moving said cable, said cable being connected to the elevator and extending around said pulleys to cause the carriage to travel and the elevator to raise when the carriage is stopped in its travel, and a stop means for the carriage comprising a latch arranged for selective operation and positioned in the path of movement of the carriage whereby to stop its movement while the cable is being moved and to thereafter effect raising of the elevator upon further movement of the cable.

2. A vehicle storage device comprising a storage rack arranged to receive motor vehicles on a plurality of levels, a carriage mounted on the rack to travel most of the length thereof, a selective stop for said carriage, an elevator mounted on the carriage for conveying a vehicle from one level to the other, an operating cable connected to the elevator and cooperating with the carriage to cause the carriage to travel with the cable to a position determined by said selective stop and thereafter effect elevation of the elevator as the cable is moved relative to the carriage.

3. A vehicle storage device comprising storage rack sections arranged to receive motor vehicles in a plurality of positions, an open space between the sections, spaced track means arranged longitudinally of the open space, conveyor means mounted on the track for traveling along said open space, a selective stop for said conveyor, vertical guide means arranged on the conveyor, an elevator on the vertical guide means, said elevator arranged to receive a vehicle to be conveyed from one position to another when the conveyor is caused to travel on said track, a single power means, and a single operating element driven thereby for both moving said conveyor means and elevating said elevator, said operating element being operatively connected with said elevator and operatively connected with but movable relative to said conveyor means so that said conveyor means will function as selected by said stop during operation of said power means and until said conveyer engages said stop, and said elevator will thereafter function during further operation of said power means.

4. A vehicle storage device comprising a storage rack arranged to store motor vehicles in a series of positions thereon, a drive-way provided in front of said rack, conveyor means, elevator means carried thereby and arranged to receive a vehicle from the driveway and convey the same to any of said positions, a stop means comprising a latch mounted on the conveyor for selectively stopping the travel thereof, a plurality of stops on said rack to correspond to said positions, a controller mounted on said elevator, operative connection means from said controller to said stop means in any position of said elevator relative to said conveyor, and power means arranged to operate said conveyor means so that it may be moved to a predetermined position as selected by the stop means and controlled from a position on said elevator and said power means may thereafter continue to operate without imparting further movement to said conveyor means.

5. In a vehicle storage device for conveying and storing motor vehicles, a carriage, an elevator carried thereby, said carriage having pulleys and being arranged to convey said elevator in a horizontal direction and said elevator being arranged to convey a vehicle in a vertical direction, a cable operatively connected to said elevator and extending around said pulleys to cause the carriage to travel and the elevator to raise upon winding of the cable, power means for winding said cable, and selective stops means for said carriage to predetermine the position thereof as the cable is wound and thereafter in conjunction with further winding of said cable to effect raising of said elevator.

6. A vehicle storage device for conveying and storing motor vehicles comprising a carriage, an elevator carried thereby, said carriage having pulleys and being arranged to convey said elevator horizontally and said elevator having pulleys and being arranged to convey a vehicle vertically, and turntable means mounted on said elevator, a common operating means for said carriage, elevator and turntable means, said common operating means comprising a wire rope directly connected to said turntable, passing around said pulleys of said elevator and around said pulleys of said carriage for sequentially turning, horizontally conveying and vertically elevating the vehicle, power means for moving said wire rope, and stops for said turntable means and said carriage to limit movement of each and cause operation of the carriage following operation of the turntable means and operation of the elevator following operation of the carriage.

7. In a vehicle storage device for conveying and storing motor vehicles, a carriage, an elevator carried thereby, said carriage being arranged to convey said elevator horizontally and said elevator being arranged to convey a vehicle vertically, a turntable mounted on said elevator for turning the vehicle, a common operating means comprising a cable operatively connected to said carriage and to said elevator and directly connected to said turntable so that the vehicle may be sequentially turned, conveyed horizontally and conveyed vertically, power means for driving said operating means, and means to limit rotation of said turntable and movement of said carriage and to initiate movement of said carriage following rotation of said turntable to its limit of movement and thereafter initiate movement of said elevator following movement of said carriage to its limit of movement.

8. In a vehicle storage device, a storage rack having a side portion and an open portion, said side portion being provided with transverse runways on a plurality of levels for receiving motor vehicles in selected positions, said open portion including spaced track members arranged at right angles to said runways, conveyor means mounted on said track members to travel thereon, vertical guides on said conveyor means, elevator means mounted on said guides to travel up and down relative thereto, turntable means arranged on said elevator means for receiving a vehicle driven thereon in one direction and to turn said vehicle for driving off in another direction so that the vehicle may be stored in said rack, and a common operating means comprising a wire rope so connected with the turntable as to turn it through a predetermined distance, movable relative to the conveyor means so as to cause it to travel through a predetermined distance and movable relative to the elevator means so as to raise it all in the sequence named, power means for moving said wire rope, and means for controlling said power means.

9. A vehicle storage device comprising a storage means having a plurality of storage spaces arranged to receive motor vehicles, a conveyor means arranged to ply back and forth in close proximity to said storage means for delivering vehicles thereto, turntable means mounted on said conveyor means and arranged to receive vehicles driven thereon in one direction and to deliver the same therefrom in another direction for storing, a common operating means for the conveyor means and the turntable means, said common operating means comprising a stationary drum, a cable having both ends wound thereon for take-up of one end and let-off of the other end as the drum is rotated, pulleys on said carriage, said cable being connected with said turntable means and passing around said pulleys, means to limit the rotation of said turntable whereby said cable is moved, said turntable rotates first and said conveyor moves thereafter during further movement of the cable, power means for driving said cable, and controlling means arranged to govern said power means.

10. A vehicle storage device comprising a rack structure, carriage means and elevator means, said rack structure being arranged for the reception of motor vehicles in a plurality of fixed positions on a plurality of levels, said carriage means and elevator means being arranged to convey motor vehicles from one fixed position to another and from one level to another, a turntable mounted on said elevator means for turning vehicles, power delivery means provided for operatively driving said carriage means and elevator means and for articulating said turntable, to convey vehicles both laterally and vertically for storing, control means for operating said power delivering means, and stops constituting shoulders against which said turntable and said carriage means physically engage to limit said turntable and said carriage means to stop turning of said turntable and initiate horizontal movement of said carriage means and to stop horizontal movement of said carriage means and initiate vertical movement of said elevator means sequentially upon operation of said power delivery means.

ELLSWORTH W. AUSTIN.